UNITED STATES PATENT OFFICE.

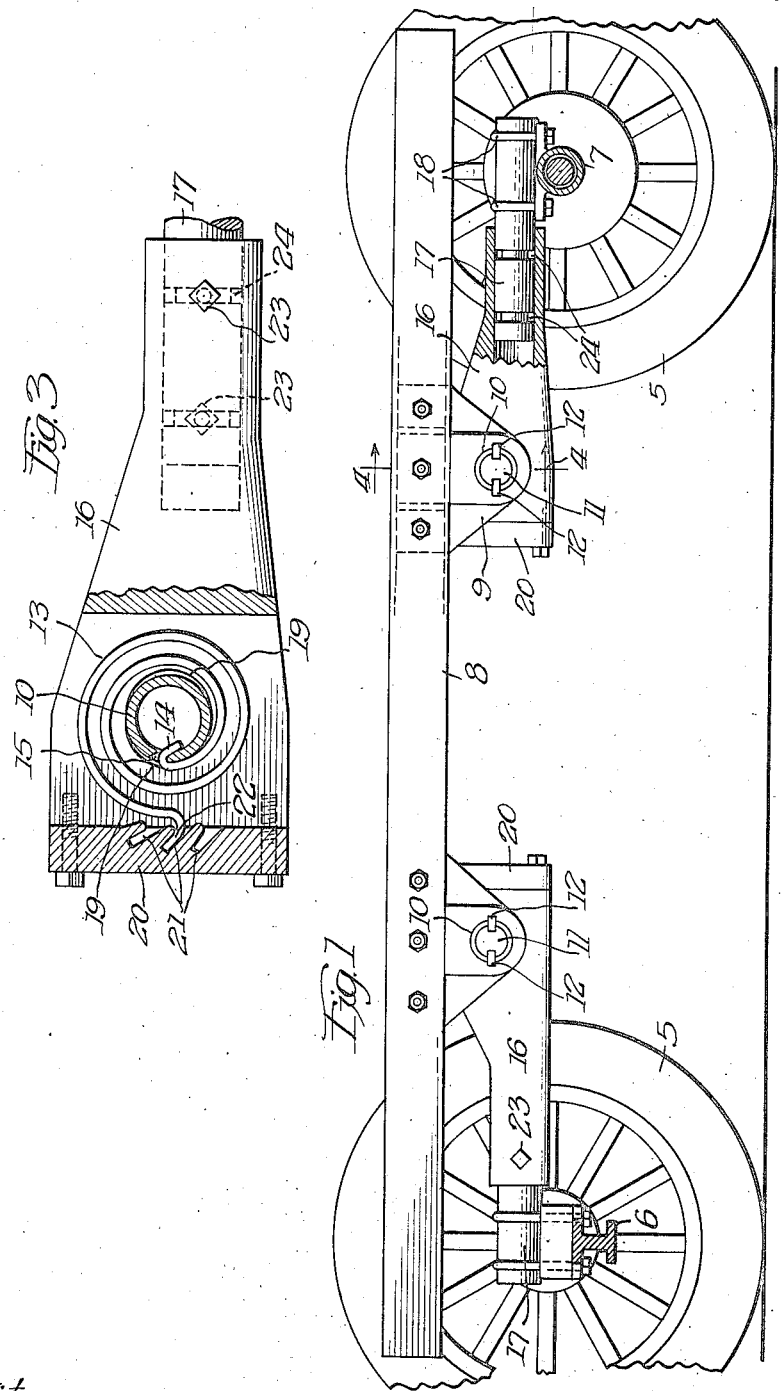

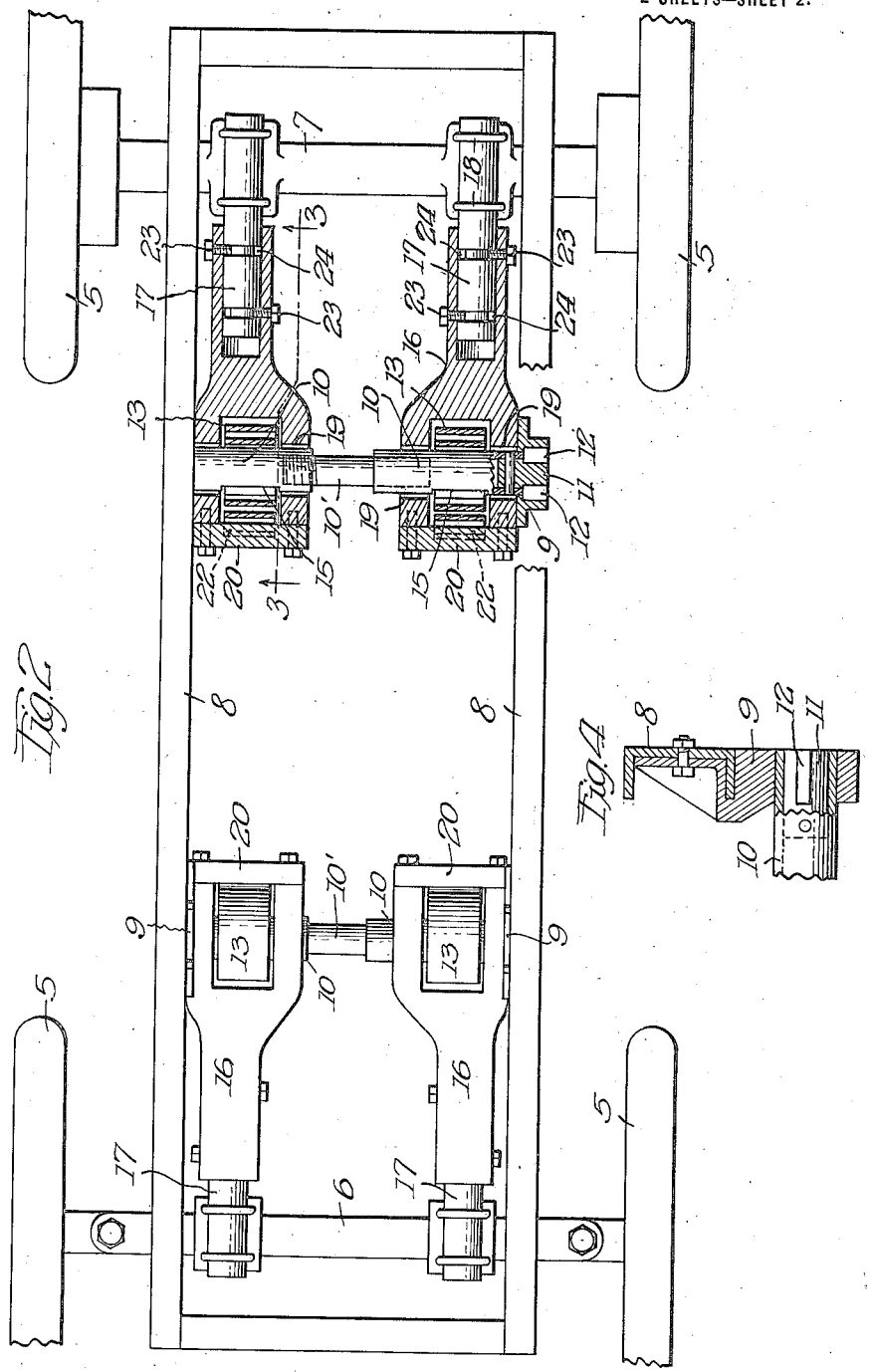

ALBERT HUPP, OF OAK PARK, ILLINOIS.

ANTIVIBRATION-SUPPORT FOR VEHICLE-BODIES.

1,373,331. Specification of Letters Patent. Patented Mar. 29, 1921.

Application filed December 19, 1917. Serial No. 207,810.

*To all whom it may concern:*

Be it known that I, ALBERT HUPP, a citizen of the United States, residing at Oak Park, in the county of Cook and State of Illinois, have invented certain new and useful Improvements in Antivibration-Supports for Vehicle-Bodies, of which the following is a specification.

This invention relates to a novel means of supporting a vehicle body on its running gear so as to absorb the up-and-down shocks and vibrations due to rough roads that are, to a greater or less extent, transmitted to the vehicle body even when the most approved forms of springs and other known shock absorbers are employed. It is well known that the full and parti-elliptic springs commonly used on road vehicles, and the helical springs used alone or in association with elliptic springs on railway cars do not prevent the transmission to the body of the vehicle or car of the vibrations of the running gear but merely soften or cushion the shock and reduce the extent of movement. The main purpose of the present invention is to produce a yieldable support for a vehicle body on its running gear of such a character that the up-and-down vibrations of the latter shall be converted into an oscillating movement of the elastic element of the supporting means about a fixed axis.

The principle of this invention, its structural essentials, mode of operation, and advantages will be readily understood by those skilled in the art from the following description taken in connection with the accompanying drawings wherein I have illustrated one practical and workable embodiment of the invention, and in which—

Figure 1 is a side elevation, partly in vertical longitudinal section of the running gear and chassis frame of an automobile, with my invention applied thereto;

Fig. 2 is a top plan view, partly in horizontal longitudinal section, of the same;

Fig. 3 is an enlarged detail, in section, on the line 3—3 of Fig. 2;

Fig. 4 is a sectional detail on line 4—4 of Fig. 1.

Referring to the drawings, 5 designates the wheels and 6 and 7 the forward and rear axles, respectively, of an automobile chassis or running gear, and 8 designates the usual channel side bars or sills that extend the full length of the chassis and constitute the immediate body-supporting elements of the structure. I have not herein shown the usual engine and line transmission of an automobile, partly because these features have nothing to do with the present invention and would only obscure the illustration, and partly because the invention may be applied to horse-drawn vehicles and, when so applied, may be used either with or without the usual reach connecting the front and rear axles.

In standard automobile practice the long body-supporting side bars 8 are commonly connected to the axles 6 and 7 through the agency of full or parti-elliptic springs. My present invention dispenses with these springs and substitutes what might be termed an auxiliary or sub-frame construction that consists chiefly of four independent spring and link connections from the side bars 8 to the axles, two on each side of the vehicle. As these four connections are all alike, the front connections being merely reversed endwise relative to the rear connections, a description of one of the latter will suffice.

Strongly secured to and depending from the bar 8 is a bracket 9, in which is rigidly secured an inwardly extending lateral shaft 10. The shaft 10 is preferably tubular and its inner end is strongly secured in and to the bracket 9 as by means of a filler plug 11 carrying keys 12 which engage registering key-ways in the plug, shaft and bracket as indicated in Figs. 1 and 2. Opposed shaft sections 10 are preferably connected at their inner ends by a coupling member 10′ preferably rigid with one section and telescoping the other that affords increased support and renders the structure adjustable to varying widths of chassis frame.

13 is a powerful helical spring, the inner end of which is secured in and to the shaft 10 as by means of a hooked end 14 entering a slot 15 in the shaft. The working axis of this spring coincides with the longitudinal axis of the shaft 10, and the outer end of the spring is adjustably secured to what I term a link that extends to and rests upon the axle 6 or 7, preferably being strongly secured to the latter by a fastening clip similar to those now used for securing the centers of elliptic or semi-elliptic springs to the axle. In its preferred embodiment this link comprises an inner member 16 having a forked end, as clearly shown in Fig. 2, that is apertured so as to have pivotal engagement upon and with the shaft 10, and an outer member 17 that telescopes within the tubular outer end of the portion 16 and is rigidly secured to the axle as, for instance, by the clips 18. To provide for a slight end play of the link relatively to the side bar 8 and bracket 9, in constructions where the forward and rear axles may be rigidly connected the apertures in the forked end of the link may be slightly elongated, as shown at 19.

20 designates a transverse member that is bolted to and rigidly connects the outer ends of the parallel members of the fork, and this transverse member is formed on its inner side with a series of notches 21 that are adapted to receive the hooked outer end 22 of the spring, as clearly shown in Fig. 3. The forked end of the link is preferably open at top and bottom as indicated to facilitate access to and adjustment of the spring. The two members 16 and 17 of the link are locked against endwise separation by screws 23 in the inner member entering annular grooves 24 formed in the outer member.

The device operates on the following principle. When a wheel encounters an obstruction in the road, such as a stone, which causes it to rise in order to surmount the obstacle, there is, of course, a substantially vertical upward movement of the axle relatively to the vehicle body to an extent depending upon the height of the obstruction. This causes the link which is nearest the wheel encountering the obstruction to swing upwardly substantially on the axis of the shaft 10 as a pivot. This causes the inner end of the link, to which the outer end of the spring is connected, to undergo a slight downward swing, which slightly oscillates the spring in a winding-up direction, it being remembered that the inner end of the spring is anchored to the shaft 10 which, in turn, is rigidly locked to the vehicle body support. When the axle drops, as when the wheel enters a hole or rut, the link swings in the opposite direction, its outer end dropping away from the vehicle body, while its inner end, to which the spring is attached, undergoes a slight rising movement, permitting an oscillating movement of the spring in an unwinding direction. However, with the parts constructed substantially in the relative proportions indicated in the drawings, a rise or fall of six inches in the axle creates a down or up movement of the outer end of the spring of only about one inch. The shaft 10 and the spring itself are, of course, made very strong to withstand the severe stress to which they are subjected by reason of the relatively long leverage between the axle and the shaft 10 and the relatively short leverage between the two ends of the spring.

From the foregoing it will readily be seen that the vertical vibrations of the axles are, through the body-supporting mechanism shown and described, converted into rotary or oscillating movements of the helical spring about a substantially fixed axis.

While the connecting links between the spring and the axle may be one-piece members for the sake of simplicity, if desired, I prefer giving them the construction shown and described, or some equivalent construction, which permits the two ends to turn relatively about the longitudinal axis of the link in order to take care of the lateral tilting strains to which the body and chassis are subjected in service. On very rough roads it not infrequently happens that one wheel mounts an obstacle at the same time that the opposite wheel drops into a hole or rut, thereby causing a substantial tilting of the axle. When anything of this sort happens, the members 17 can turn in the tubular ends of the members 16 without thereby placing any twisting strain on the springs 13 or any bending strain on the shaft sections 10.

It will be evident that lateral shocks on the wheels in the direction of travel caused by obstructions on the road surface produce the same tilting or swinging of the links on the axes of the shafts 10 as are caused by substantially vertical shocks, and are likewise absorbed by the springs in the same way.

While it is contemplated that the invention will be applied chiefly to automobiles and other motor vehicles, not only to take the place of the usual supporting springs and shock absorbers but also to dispense with the necessity of pneumatic tires and rubber generally, yet it will be manifest that the invention is equally applicable to street cars, railway cars, and horse-drawn vehicles and, when embodied in the latter, enables the usual reach between the front and rear axles to be dispensed with, since the forward and rear axles are connected through the links, shafts 10, brackets 9 and sills 8.

One of the principal advantages of the present invention lies in the fact that it does away with the necessity of pneumatic tires with all the inconveniences and delays caused by punctures, blow-outs and the like. In fact, it obviates the necessity of cushion tires of any sort, although solid rubber tires or hollow tires stuffed with any of the known "fillers" now on the market will preferably be employed in order to cushion the wheels themselves and the oscillatory connections between the wheel axles and the chassis frame, and to eliminate noise.

Another advantage of the invention lies in the fact that it can be readily applied to most of the known makes of automobiles by simply removing the present springs by which the chassis frame is supported on the axles and substituting the auxiliary frames and torsion springs herein shown and described. The device has an element of safety, because, if a spring should break, the worst that could happen would be a settling of the chassis frame at that side down on to the axle, since the parts are locked together lengthwise, independently of the presence or absence of a reach between the axles.

My invention is of especial value and utility on army and other ambulances and like vehicles intended for the transportation of the sick and wounded, in that it reduces to a minimum the jolting and bouncing that not only causes intense suffering but is often fatal to the severely wounded.

I do not limit the invention to the particular embodiment herein disclosed for purposes of illustration, but reserve all such modifications, variations and mechanical equivalents as fall within the scope and purview of the appended claims.

I claim:

1. In a vehicle, the combination with an axle, and a body-supporting element, of a shaft rigid with and extending laterally of said element, a helical spring connected at its inner end to said shaft, and a link having a forked end portion pivoted on said shaft and straddling said spring and adjustably connected to the outer end of the latter to regulate the tension, the other end of said link being connected to said axle.

2. In a vehicle, the combination with an axle, and a body-supporting element, of means for supporting the latter on the former comprising a helical spring having its inner end secured to said element, and a link connected at one end to the outer end of said spring and at its other end to said axle, the two ends of said link being capable of a relative turning movement about the longitudinal axis of the link.

3. In a vehicle, the combination with an axle, and a body-supporting element, of means for supporting the latter on the former comprising a helical spring having its inner end secured to said element, and a link connected at one end to the outer end of said spring and at its other end to said axle, said link comprising telescoping parts having a relative turning movement about the longitudinal axis of the link but connected against endwise separation.

4. In a vehicle, the combination with an axle, and a pair of bars overlying said axle and adapted to support the vehicle body, of independent alined shafts rigid with and extending laterally of said bars respectively, helical springs connected at their inner ends to said shafts, and independent links pivoted on said shafts and connected at one end to the outer ends of said springs and at the other end to said axle, the opposite ends of said links being capable of a relative turning movement about their respective longitudinal axes.

5. In a vehicle, the combination with an axle, and a body supporting element, of a link rigid against transverse bending so pivotally connected to said axle at one end and to said element at the other end as to permit turning in a vertical plane at either end, the two ends of said link being capable of a relative turning movement about the longitudinal axis of the link and a spring at one end of said link at its pivotal connection tending to prevent rotation on said pivot in one direction.

ALBERT HUPP.